(No Model.)
E. H. AMET.
BRUSH SHIFTER FOR DYNAMO ELECTRIC MACHINES AND MOTORS.
No. 371,536. Patented Oct. 18, 1887.
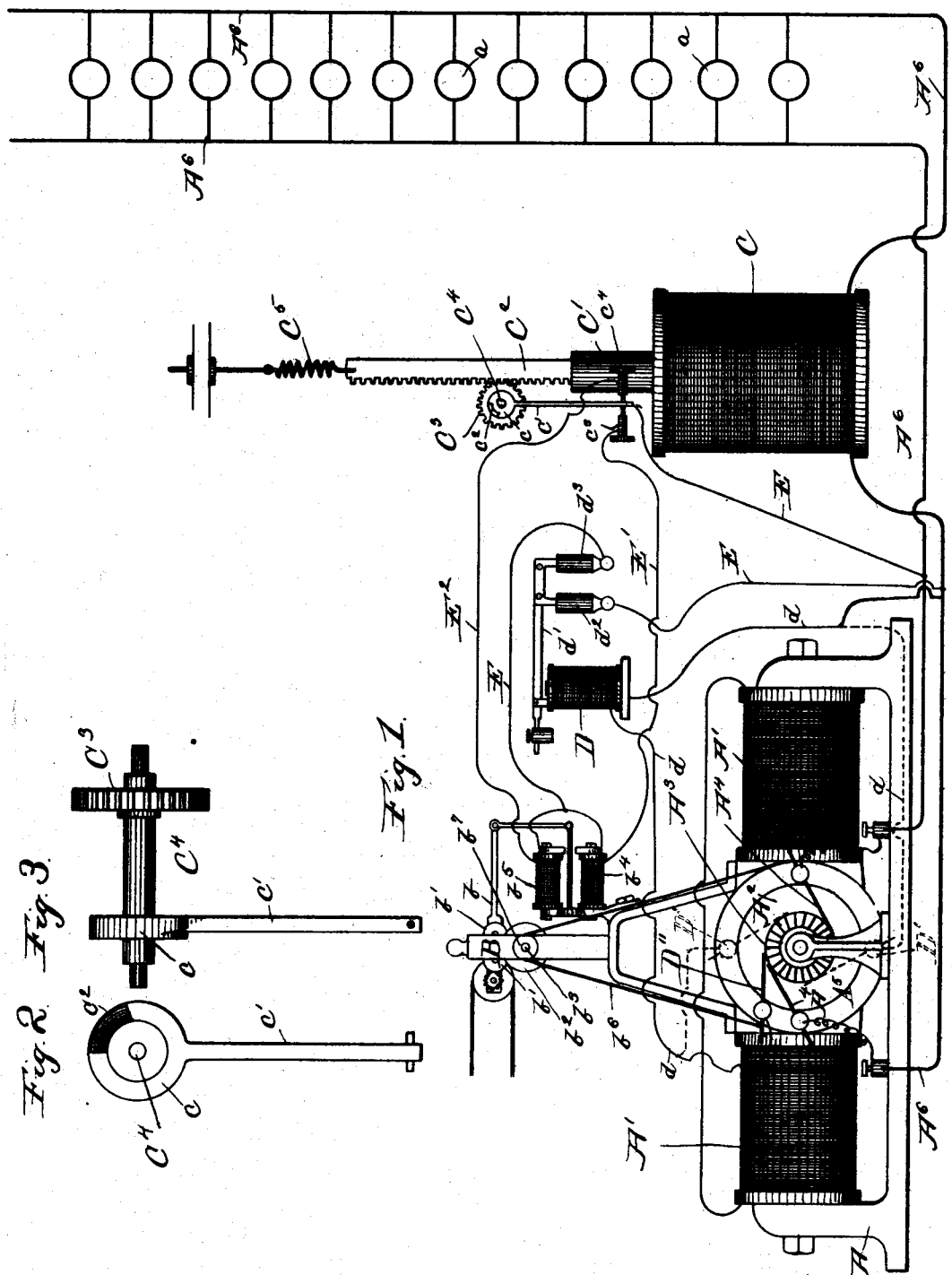
Witnesses:
Geo. E. Curtis.
H. M. Munday.
Inventor:
Edward H. Amet
By Munday, Evarts & Adcock
his Attorneys.

UNITED STATES PATENT OFFICE.

EDWARD H. AMET, OF CHICAGO, ILLINOIS, ASSIGNOR TO HIMSELF AND HERBERT A. STREETER, OF SAME PLACE.

BRUSH-SHIFTER FOR DYNAMO-ELECTRIC MACHINES AND MOTORS.

SPECIFICATION forming part of Letters Patent No. 371,536, dated October 18, 1887.

Application filed April 9, 1887. Serial No. 234,239. (No model.)

*To all whom it may concern:*

Be it known that I, EDWARD H. AMET, a citizen of the United States, residing in Chicago, in the county of Cook and State of Illinois, have invented a new and useful Improvement in Brush-Shifters for Dynamo-Electric Machines and Electric Motors, of which the following is a specification.

My invention relates to automatic devices for shifting the brushes on dynamos and motors.

Heretofore dynamo-machines have been provided with automatic devices for shifting the commutator-brushes which operate to maintain a constant current-strength in the external or working circuit, the controlling-magnet of the brush-shifter device being set or balanced to maintain a current of some particular degree—as, for example, twenty ampères. In many cases, however, the load, resistance, or work required to be done by the external circuit is constantly subject to great variations. For example, in large shunt-wound dynamos used for smelting ores the variation in the load or resistance, depending upon the condition of the furnace, is very great, varying sometimes from three thousand ampères to as low as five hundred.

It is the object of my invention to provide a device or system for automatically shifting the brushes of dynamos and motors which will operate upon either shunt or series wound machines, and will serve to keep the brushes in proper position to prevent sparking, whatever may be the load or current required in the external circuit.

To this end my invention consists, in connection with a dynamo-machine and its commutator-brushes and external or working circuit, of a controlling magnet or solenoid connected with said circuit for governing the direction in which the brushes shall move and a second magnet connected in circuit with a supplemental commutator-brush or a pair of commutator-brushes to govern the time or extent of movement of the commutator-brushes. This second magnet receives and is energized by the current which would, but for the additional brush or brushes, produce the spark, and this magnet is only energized by what I may term the "sparking-current," and only so long as the main brushes are out of proper adjustment or position in relation to the neutral line of the commutator or armature. By means of the two controlling-magnets—one for determining the direction in which the brushes should be moved and the other the extent to which they should be moved—the sparking of the dynamo or motor may be entirely prevented. The core or armature of the controlling solenoid or magnet in the main circuit is connected to the switch to be operated by such magnet by means of a friction or yielding device, so that the core may remain in any desired position, depending upon the amount of current in the external circuit, and still any increase in the amount of such current will operate to move the switch-lever one way or the other, whatever may have been the previous position of the core.

My invention also consists in the novel devices and novel combinations of devices herein shown and described, and more particularly pointed out in the claims.

In the accompanying drawings, which form a part of this specification, and in which similar letters of reference indicate like parts, Figure 1 is a front elevation of a device embodying my invention, showing also a diagram of the circuits. Fig. 2 is an enlarged detail end or plan view of the friction or yielding switch-lever, and Fig. 3 is a side view of the same.

In said drawings, A represents the dynamo-machine, which may be of any ordinary kind or construction. In the drawings a shunt-wound dynamo is represented.

A' A' are the field-magnets; A², the armature; A³, the commutator; A⁴ A⁴, the main brushes; A⁵, the movable ring or collar upon which the brushes are carried; A⁶, the external or main working-circuit, and *a a* translating devices—for example, incandescent lamps.

B is a device or mechanism for operating the brushes. This device may be of any suitable construction. I prefer, however, to employ the device for this purpose shown and described in Letters Patent No. 340,539, granted to me April 27, 1886. It consists, briefly, in a lever, *b*, carrying a pair of constantly-driven wheels, $b'\,b'$, one or the other of which engages or neither of which engages a friction-wheel, $b^2$, on the pulley-shaft $b^3$, according as the lever $b$ occupies its normal position or is tilted one way or the other by the magnets $b^4\,b^5$. A belt, $b^6$, connects the pulley $b^7$ with the commutator-ring. This mechanism is fully shown and described in the patent above mentioned, and for more complete description of the same I would refer to said patent, as my present invention does not consist in the particular form or kind of mechanism employed for communicating motion to the brushes.

C represents a solenoid connected in the main circuit, either in series or in shunt, for controlling the direction in which the brushes should move from time to time to prevent sparking at the commutator-brushes.

D represents a magnet connected in circuit $d$ with a supplemental commutator-brush, D″, or preferably a pair of supplemental brushes, D′ D′, for controlling the extent of movement of the main brushes. The circuit $d$ leads from the upper supplemental brush D′ to the magnet D, and thence to the opposite supplemental brush D′. In case but one supplemental brush is employed—the lower one, for example, being omitted—the circuit $d$ will lead from the magnet D to the main circuit $A^6$, as indicated by the dotted line in Fig. 1.

Where two supplemental brushes, D′ D′, are employed, as indicated by the dotted lines in Fig. 1, the two brushes will be located diametrically opposite each other and bear on the commutator ninety degrees from the main brushes $A^4\,A^4$—that is to say, at the neutral line—when the main brushes are in their proper position. These brushes will thus receive no current as long as the main brushes are in proper adjustment. The moment, however, the neutral line shifts the supplemental brushes D′ D′ will receive current and energize the magnet included in their circuit. Where but a single supplemental brush is employed, it is located just in advance of one of the main brushes, as shown by the heavy lines in Fig. 1, and the circuit $d$ connects with the main brush on the same side or with the main line $A^6$, leading to said main brush, so that the circuit $d$ will receive current and actuate the magnet D whenever and so long as there is a difference of potential between the main and supplemental brushes—that is to say, whenever the main brush is to either side the point of highest potentiality or maximum delivery of current. When the main brush is thus out of its proper adjustment, the current which would ordinarily cause the spark will flow through the supplemental brush and the circuit $d$ and its magnet D.

The function of the magnet D, when energized by what may be termed the "sparking-current" from the supplemental brush D′ or D′ D′, is to operate a switch, $d'$, and close the circuit E at $d^2$, in which the magnets $b^4\,b^5$ are included, one or the other, and thus determine how long the lever $b^4$ shall depress one or the other of its constantly-revolving friction-wheels against the friction-wheel on the pulley-shaft and move the brushes.

The core C′ of the magnet C is provided with a rack, $C^2$, which meshes with the gear $C^3$, fixed on the shaft $C^4$. The shaft $C^4$ is furnished with a friction-ring, $c$, to which ring a switch-lever, $c'$, is secured. The frictional yielding connection between the shaft $C^4$ and the ring $c$, I prefer to produce by employing a permanent steel magnet for the shaft and making the ring $c$ of brass or other non-magnetic material and providing the same with a soft-iron segment, $c^2$, so that the attraction between the magnet and the soft iron will produce a sufficient resistance to cause the switch $c'$ to swing to one side or the other against the contact-points $c^3\,c^4$ whenever the core C′ of the solenoid is moved either up or down, and still offer a very slight resistance to the further free movement of the core in the same direction, so that the core will respond to slight variations of current in the main circuit. The contact-point $c^3$ is connected by a wire, E′, in circuit with the magnet $b^4$, and the contact point or screw $c^4$ is connected by a wire, $E^2$, with the magnet $b^5$.

The switch-lever $c'$ is connected by the circuit-wire E with the main circuit. The circuit E, in which the magnets $b^4\,b^5$ are included, branches at the contact-points $c^3\,c^4$ into the paths E′ $E^2$ and reunites after passing through the magnets.

In operation, when the main brushes occupy their normal or proper position, the supplemental brushes D′ D′ will receive no current, the magnet D will not be energized, and the circuit E will be open at $d^2\,d^3$. The moment, however, any change occurs in the external circuit-current and the neutral line of the commutator shifts, so that a spark would ordinarily, but for my improvement, be produced at the main brushes, the supplemental brushes D′ D′ will take this sparking-current, energize the magnet D, and close the circuit E by depressing the lever $d'$ into the mercury contacts $d^2\,d^3$. If the change in the external circuit be an increase, the core C′ of the solenoid will be pulled downward or inward, and the switch $c'$ thus thrown into contact with the contact-point $c^3$, thereby closing the circuit E E′ E through the magnet $b^4$, and thus cause the brushes to be moved in the proper direction until the main brushes again assume their normal or proper position, so as to tend to produce no spark or give any current to the supplemental brush D′. The moment the current on the circuit $d$ ceases the circuit E will be broken at $d^2\,d^3$ and the further movement of the brushes will be arrested. If, on the other hand, the change in the external circuit be a decrease, the core C′ will move upward in obedience to the spring $C^5$, and thus close the circuit E $E^2$ E at $c^4$ through the other magnet, $b^5$, and thus cause the main brushes to move in the opposite direction until they again assume their proper position. The frictional or yielding connection between the core C′ and the switch-lever $c'$ permits the core to continue its upward and downward movement and automatically assume different positions of rest and equilibrium according to the variations required in the current-strength of the external circuit. For example, if the load or work to be done by the external circuit be such as to require five hundred ampères, the core $C'$ will assume a corresponding position and the brushes will be automatically adjusted so as to produce no spark or current through the supplemental brush or brushes. The moment, however, the load changes, so that a greater or less current is required, the neutral line of the armature will be changed thereby in relation to the brushes, thus causing a current to pass through the supplemental brush or circuit $d$ and the operation before described will take place. In other words, the shunt-wound dynamo, as is well known, tends always to automatically adapt or adjust itself to the current required by the external circuit load or resistance by the shifting of the neutral line of the armature in relation to the brushes, and the controlling-magnets C and D, in connection with the brush-shifter mechanism and its operating-magnets $b^4$ $b^5$, operate to move the brushes to correspond to the variation in the position of the neutral line, and thus prevent any sparking or injury to the brushes or commutator.

My apparatus or system is thus adapted to automatically shift the brushes and prevent sparking, whatever may be the current from time to time required of and produced by the dynamo, and it is equally applicable where a constant current is desired to be maintained.

I claim—

1. The combination, with a dynamo or motor having main commutator-brushes and brush-shifting mechanism, of a supplemental commutator-brush, a magnet connected in circuit with said supplemental brush for automatically governing the extent or time of movement of the brush-shifting mechanism, and thus preventing sparking at the main brushes, a controlling-solenoid connected with the external circuit for determining the direction of movement of the brushes, and a switch-lever operated by the movable core of said solenoid through a frictional or yielding device to allow the free continued movement of the solenoid-core, whereby the apparatus is adapted to control the movement of the brushes whatever be the amount of current on the external circuit, substantially as set forth.

2. The combination, with a dynamo or motor having main commutator-brushes and brush-shifting mechanism, a supplemental commutator-brush, $D''$, a controlling-magnet, D, connected in circuit $d$ with said supplemental brush, switch-lever $d'$, and contacts $d^2$ $d^3$, for opening or closing the circuit E E' E$^2$ E through the magnets $b^3$ $b^4$, of the brush-shifting mechanism, controlling-solenoid C, connected in the external circuit, having a core, $C'$, furnished with a rack, $C^2$, gear $C^3$, magnetic shaft $C^4$, loose non-magnetic ring $c$, furnished with soft-iron segment $c^2$ and switch-lever $c'$, and contacts $c^3$ $c^4$, all combined and operating substantially as specified.

3. In an automatic brush shifter or controlling mechanism of a dynamo-machine, the controlling-solenoid C, having core $C'$, and rack $C^2$, in combination with gear $C^3$, magnetic shaft $C^4$, loose non-magnetic ring $c$, having soft-iron segment $c^2$, and switch-lever $c'$, substantially as specified.

EDWARD H. AMET.

Witnesses:
H. M. MUNDAY,
EDMUND ADCOCK.